April 14, 1970     O. C. NIEDERER     3,505,782
EGG CARTON CLOSING MECHANISM

Filed March 8, 1967     4 Sheets-Sheet 1

INVENTOR.
OTTO C. NIEDERER
BY Sperry and Zoda
ATTORNEY

April 14, 1970      O. C. NIEDERER      3,505,782

EGG CARTON CLOSING MECHANISM

Filed March 8, 1967      4 Sheets-Sheet 2

INVENTOR.

OTTO C. NIEDERER

BY Sperry and Zoda

ATTORNEY

April 14, 1970   O. C. NIEDERER   3,505,782
EGG CARTON CLOSING MECHANISM
Filed March 8, 1967   4 Sheets-Sheet 3

INVENTOR.
OTTO C. NIEDERER
BY Sperry and Zoda
ATTORNEY

INVENTOR.
OTTO C. NIEDERER
BY Sperry and Zoda
ATTORNEY

United States Patent Office 3,505,782
Patented Apr. 14, 1970

3,505,782
EGG CARTON CLOSING MECHANISM
Otto C. Niederer, Bear Tavern Road,
Titusville, N.J. 08560
Filed Mar. 8, 1967, Ser. No. 621,667
Int. Cl. B65b 7/26
U.S. Cl. 53—376                                    11 Claims

ABSTRACT OF THE DISCLOSURE

Equipment for closing egg cartons of the type which contain one dozen eggs arranged with six eggs in each of two parallel rows of egg receiving cavities projecting downward from the base of the carton, and have at least one cover member hingedly connected to a longitudinal edge of the base of the carton. The equipment embodies a conveyor having yieldable and deformable means, such as coiled spring elements, thereon which are spaced apart longitudinally of the conveyor so as to enter the spaces between the egg receiving cavities in the base of the carton to positively move each carton past cover closing means. The cover closing means are symmetrically arranged with respect to the conveyor to engage and close cover members which are hingedly connected to either, or to both, longitudinal edges of the cartons moved past the same by the conveyor.

BACKGROUND OF THE INVENTION

Field of invention

The invention is directed to carton closing equipment for closing those egg cartons which contain one dozen eggs arranged in two parallel rows of six eggs each located in cavities projecting downward from the base of the carton and have cover means hingedly connected to one or both longitudinal edges of the base of the carton. The equipment has a conveyor with means thereon which yieldably support the cartons and are formed and positioned to enter the spaces between the downwardly projecting egg receiving cavities in the base of the carton to positively advance the carton to and past cover closing means. The cover closing means are arranged to fold the covers of the cartons inwardly and downwardly from either or both sides of the carton so that substantially any type of egg carton may be closed and the cartons can be passed through the equipment with either end foremost and the cover projecting from either edge of the base of the carton.

The equipment further may be provided with means for printing the date or other matter on the top of the closed carton as it passes beyond the carton closing means.

Description of the prior art

Carton closing equipment heretofore provided are exemplified by U.S. Patent No. 2,842,920 wherein cartons are supported on a belt type conveyor and are moved past cover closing means located at one side of the carton. However, the carton closing means necessarily press downward on the cover in closing the same with the result that eggs located in the carton are sometimes damaged and in any event, the carton is sometimes retarded by the closing means while the conveyor belt continues to advance and slips beneath the carton causing jamming of the cartons in the equipment. This problem is of particular concern when the cartons are formed of smooth cellular polystyrene and, therefore, tend to slip very easily with respect to a flat conveyor surface. Moreover, when the cover closing means are located at one side only of the conveyor, it is not possible to close that type of carton wherein cover members are hingedly connected to both longitudinal edges of the base. Furthermore, even when the cover is hinged at one side only of the base, the cartons cannot be turned end for end but must be fed into the equipment so that the cover will always be positioned on that side thereof on which the closing means is located.

SUMMARY OF THE INVENTION

In accordance with the present invention, the carton closing equipment is provided with a conveyor having transversely extending members which are spaced apart longitudinally of the conveyor so as to enter the spaces between the downwardly projecting egg receiving cavities in the base of the cartons whereby the cartons are positively advanced by the conveyor and slippage of the conveyor with respect to the carton as it moves past the cover closing means is prevented. At the same time, the transversely extending members of the conveyor are preferably yieldable and deformable so that they may enter the spaces between the projections in the base of the cartons even though such spaces may differ considerably in shape due to differences in the shape of the cavities provided in different styles and types of cartons. Moreover, the yieldable character of the transversely extending members on the conveyor affords a cushioned support for the cartons as they move past or beneath the carton closing members whereby cartons which vary somewhat in height may be effectively closed and the danger of damage to eggs contained in the carton is materially reduced.

The cover closing means provided in accordance with the present invention are located at opposite sides of the conveyor and above the same, and they are similar in construction and operation. As a result, the covers of the cartons may project from either or both longitudinal edges of the base of the carton as it moves past the cover closing means. Therefore, the cartons do not need to be specially positioned or arranged on the conveyor and substantially any type of carton having two parallel rows of eggs arranged in the base of the carton can be properly and rapidly closed as it passes through the equipment. It is also possible to locate a dating or other printing device adjacent the conveyor so as to apply a date or identifying mark to each carton passed through the equipment.

DESCRIPTION OF THE PREFERRED EMBODIMENT

Figure 1:
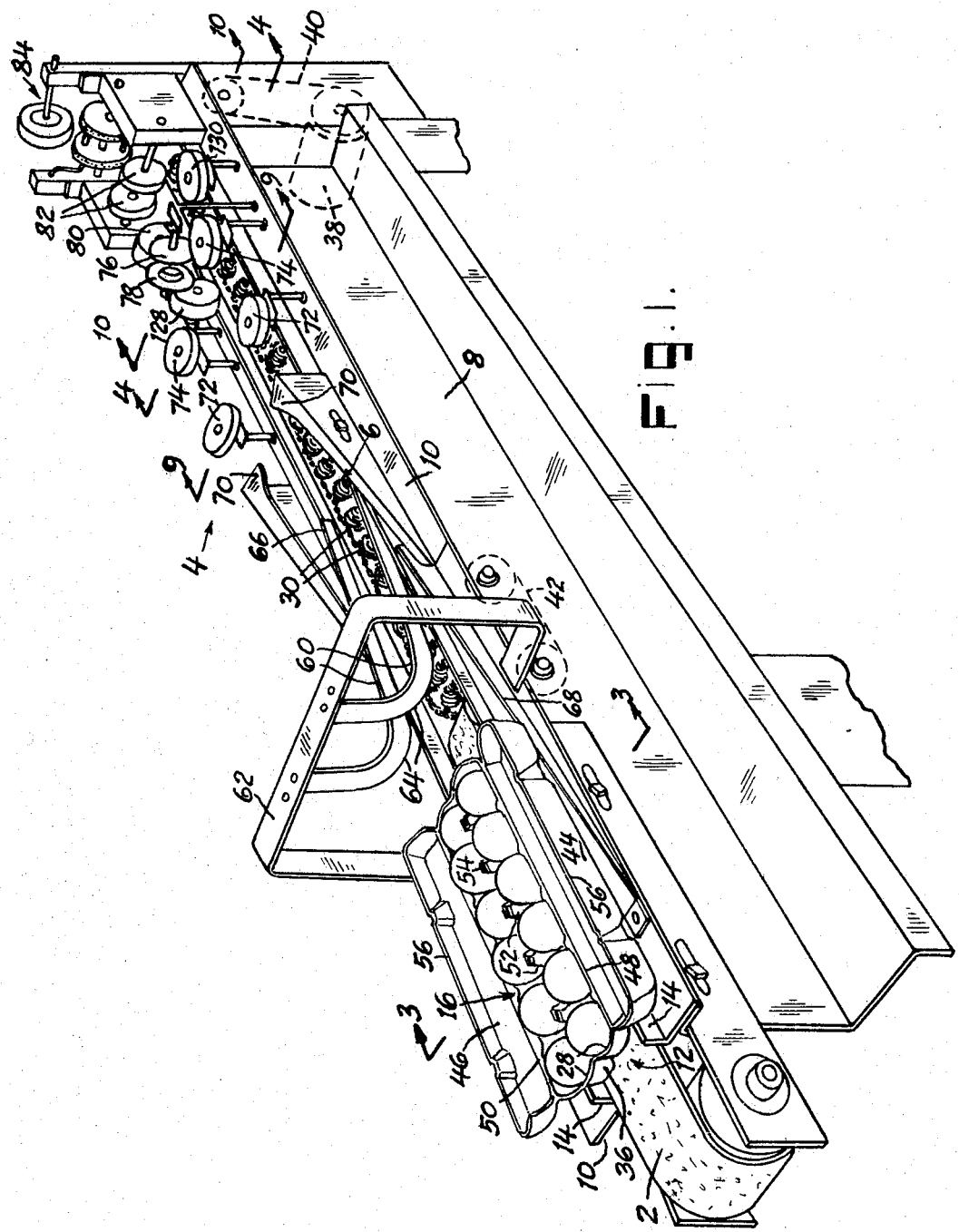
FIG. 1 is a perspective illustrating typical equipment embodying the present invention.
Figure 2:
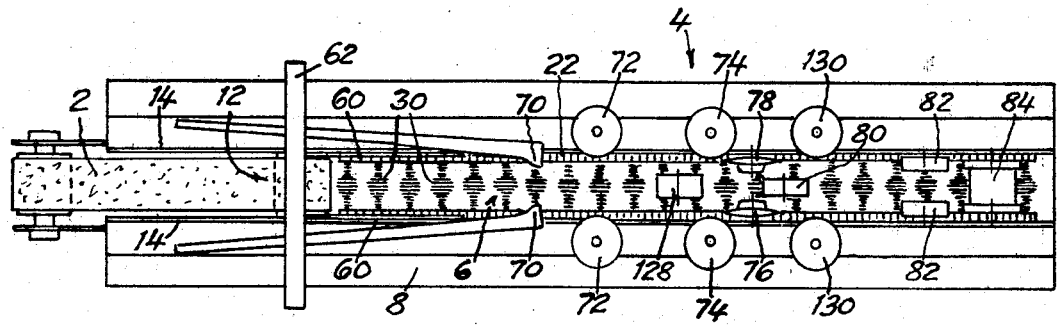
FIG. 2 is a top plan view of the construction shown in FIG. 1.

In that form of the equipment chosen for purposes of illustration in the drawings, the equipment embodies a feeding conveyor 2 by which filled egg cartons are moved into position to be engaged and advanced to and beyond the cover closing means 4 by a carton supporting conveyor 6. As shown most clearly in FIGS. 1 and 11, the equipment has a frame 8 upon which spaced angle members 10 are mounted to define a channel 12 through which the cartons are moved by the conveyor 6. The upstanding flanges 14 of the angle members 10 serve as lateral guides located at opposite sides of the channel 12 between which the base of a carton 16 is movable. Additional angle members 18 are mounted on the frame 8 and present inwardly extending flanges 20 along which the side chains 22 of the carton supporting conveyor 6 are movable.

Figure 5:
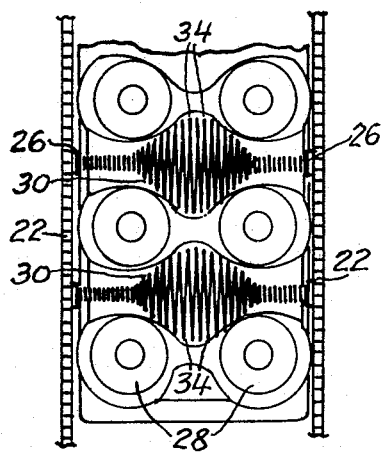
FIG. 5 is a view of the equipment shown in FIG 1 as seen from beneath the conveyor.
Figure 11:
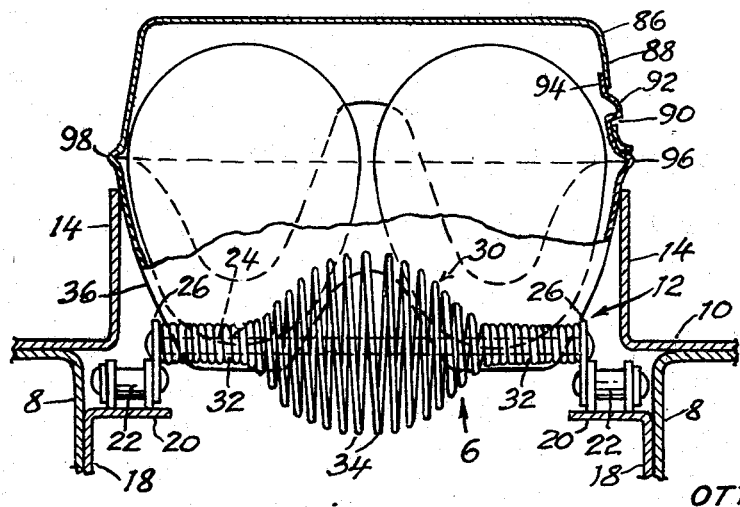
FIG. 11 is a sectional view of the closed carton of FIG. 6 supported on the yieldable conveyor of FIG. 1.

The carton supporting conveyor 6 is best illustrated in FIGS. 5 and 11, and has rods 24 extending transversely thereof and secured to brackets 26 on the chains 22 of the conveyor. The rods 24 are spaced apart longitudinally of the conveyor distances corresponding to the distance between adjacent downwardly projecting egg receiving cavities 28 in the parallel rows of cavities in the carton 16. Coiled spring elements 30 are mounted on the rods 24 and have reduced end portions 32 which bear against the rods whereas the central portions 34 of the elements 30 are of substantially larger diameter and include spaced turns of wire. The central portions 34 of the elements 30 are thus deformable and as shown in FIG. 5 are located in the area between longitudinally and transversely adjacent egg receiving cavities 28 which are of different shape or configuration. At the same time, the central portions 34 of the coiled spring elements serve to provide a yieldable or cushioned support for the cartons and positively engage the cavities in the base 36 of the carton 16. In this way, each carton supplied to the conveyor 6 by the feeding conveyor 2 will be positively engaged and advanced by the coiled spring elements 30 of the conveyor 6. The cartons are, nevertheless, yieldably supported while being positively moved longitudinally of the equipment between the lateral guide flanges 14 to and beyond the cover closing means 4, and a printing or dating device 84, if the latter is used.

The conveyors 2 and 6 may be driven by any suitable means, but as shown, a motor 38 serves to advance the conveyor 6 by means of a drive chain 40 and the supply conveyor 2 is advanced by a driving chain 42 operatively connected to a sprocket about which one of the side chains 22 of conveyor 6 is trained.

Figure 3:
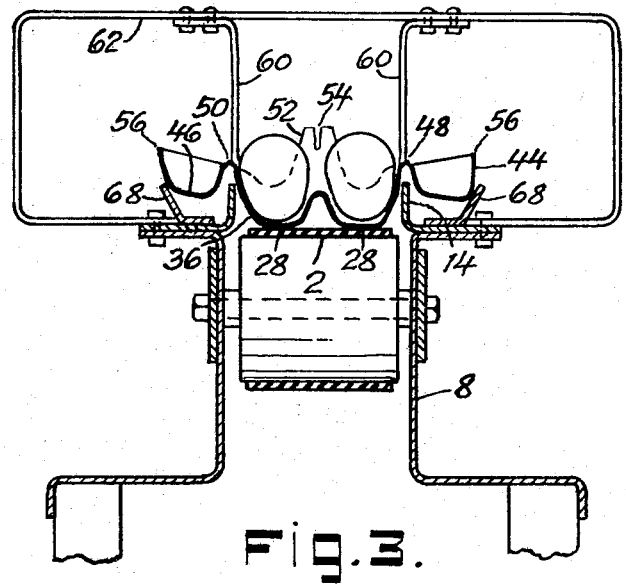
FIG. 3 is a sectional view of the equipment shown in FIG. 1 taken on the line 3—3 of FIG. 1 with one type of carton located at that point.
Figure 4:
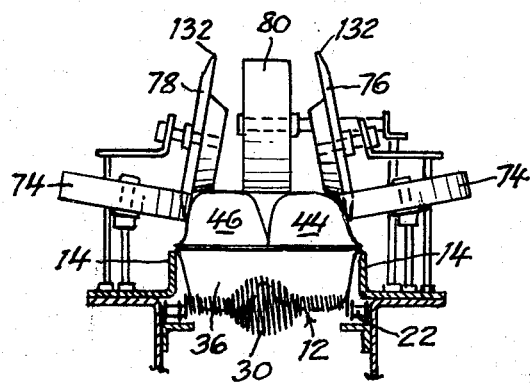
FIG. 4 is a sectional view taken on the line 4—4 of FIG. 1 with the carton of FIG. 3 closed.

As illustrated in FIGS. 1, 3 and 4 of the drawings, the type of egg carton to be closed has a base 36 with a cover in the form of two side parts 44 and 46 which are hingedly connected along the lines 48 and 50 at the opposite longitudinal edges of the base 36. Further as shown in FIG. 3, the base is provided with central upwardly projecting "pillars" 52 having slots 54 therein adapted to receive and hold the free edges 56 of the hinged cover parts 44 and 46 when the cover parts are moved inward and downward into the carton closing position of FIG. 4.

The cover closing means 4 preferably includes a plurality of elements. Thus, holddown members 60 are mounted on a bracket 62 secured to angle members 10 of the frame 8 and present rounded leading edges 64 from which downwardly inclined and tapered extremities 66 extend in the direction of movement of the conveyor 6 and the cartons thereon. The holddown members 60 are positioned above the vertically extending lateral guides 14 for the cartons as shown in FIG. 3 and the extremities 66 of the holddown members engage the cartons along the hinge lines 48 and 50 about which the cover parts 44 and 46 are to be folded inwardly.

Cover lifting plates 68 are mounted on the frame 8 and are inclined upwardly as shown in FIG. 3 so as to raise the cover parts 44 and 46 to initiate the inward folding movement of the cover parts about the hinge lines 48 and 50. Further upward and inward folding of the cover parts 44 and 46 result from engagement of said parts with the folding elements 70 which extend beyond the extremities 66 of the holddown members 60. It is generally also desirable to locate cover positioning elements, such as the rollers 72 and 74, at longitudinally spaced points and at opposite sides of the channel 12 in position to prevent lateral displacement of the cover parts. Further as shown in FIGS 1 and 4, the rollers 72 and 74 may be inclined inwardly and downwardly toward the channel 12 to aid in holding the carton down on the conveyor 6 after the carton has passed beyond the hold down members 60.

After the cover parts 44 and 46 of the carton have thus been folded inward about their hinge lines 48 and 50 as shown in FIG. 4, the carton is moved on by conveyor 6 beneath the corner pressing rolls 76 and 78 and the central press roll 80. The corner press rolls 76 and 78 serve to urge the cover parts 44 and 46 inward and downward while centering the free edges 56 thereof so that they may be pressed into the slots 54 in the "pillars" 52 which project upward from the base 36 of the carton 16. At substantially the same time, the central press roll 80 forces the free edges of the cover parts downward into retaining engagement within the slots 52 of the "pillars" whereby the cover parts 44 and 46 are securely held in carton closing position.

In most cases, additional spaced holddown rollers 82 are located between the central press roll 80 and a printing or dating device 84 adapted to apply a printed date or other matter to each closed carton as it issues from the delivery end of the equipment.

Figure 6:
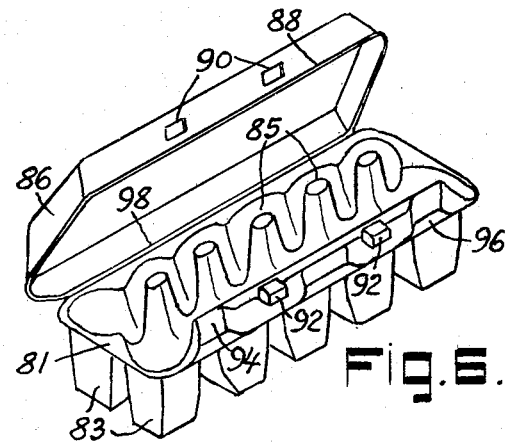
FIGS. 6 and 7 are perspectives illustrating alternative types of egg cartons which may be closed by the equipment of FIG. 1.
Figure 7:
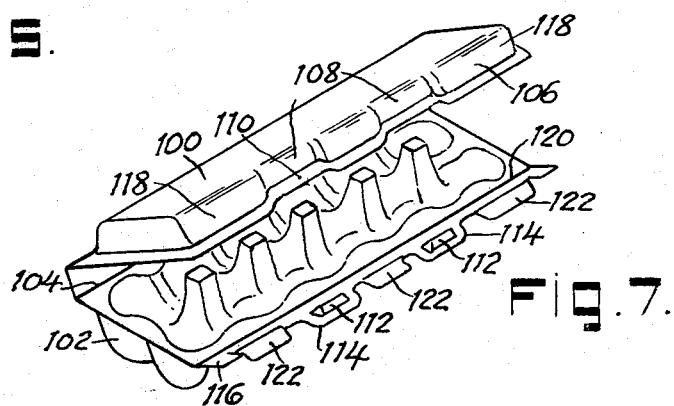

The type of egg cartons illustrated in FIGS. 6 and 7 are typical of those which have a single cover member hinged along one edge of the base of the carton. Such cartons are frequently formed of paper pulp and more recently have been made of foamed polystyrene or similar material. In any event, the base 81 of the carton shown in FIG. 6 is provided with egg receiving cavities 83 which may have various shapes or configurations, and it is common practice to provide upwardly extending "pillars" 85 in the center of the carton to support the cover 86 and reduce damage to eggs packed in the carton during the closing operation or when the cartons are stacked one upon another.

In order to hold the cover 86 in its closed position, the downwardly turned free edge 88 of the cover is generally provided with openings 90 for receiving locking projections 92 carried by an edge flange 94 hingedly connected to the base 81 of the carton along the line 96 at the side of the base opposite to the hinge line 98 about which the cover 86 is pivotally movable. As shown in FIG. 11, the edge flange 94 is designed to be positioned within the downwardly turned free edge 88 of the cover 86 when the carton is closed and the locking projections 92 project outwardly from the flange 94 so as to extend outwardly through the openings 90 in the edge 88 of the cover.

In the alternative, and as shown in FIG. 7, the cover 100 of the carton may be hingedly secured to the base 102 along the line 104 and has a downwardly turned free edge 106. Depressions 108 are formed in the edge 106 of the cover and are provided with outwardly extending retaining lips 10 which, when the cover 100 is closed, are engaged by locking lugs 112 which project inwardly from spaced locking tabs 114 carried by an edge flange 116. The locking tabs 114 are aligned with the depressions 108 in the cover 100 so as to be substantially flush with adjacent portions 118 of the cover 100. The edge flange 116 is itself hingedly connected to the base 102 of the carton along the line 120 and has cover guiding tabs 122 thereon which are positioned at opposite sides of the locking tabs 114 and designed to be located on the interior of the free edge 106 of the cover when the cover of the carton is in its closed position and held in place by the interaction of the locking lugs 112 and the outwardly projecting retaining lips 110 on the cover.

When cartons of the type shown in either FIG. 6 or FIG. 7 are advanced along the channel 12 of the equipment by the conveyor 6, the cover of the carton in either case will initially extend outward at one side or the other of the channel 12 depending upon how the carton is positioned on the feeding conveyor 2 as it is advanced to the carton supporting conveyor 6.

Figure 8:
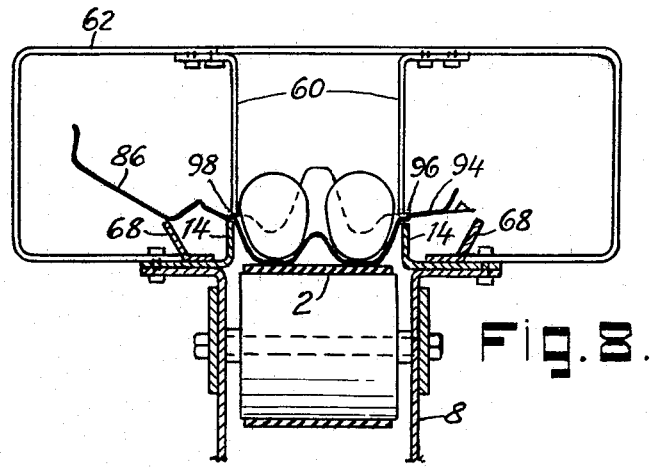
FIG. 8 is a sectional view taken on the line 3—3 of FIG. 1 with a carton of the type shown in FIG. 6 in place on the supply conveyor.

The cover 86 of the carton of FIG. 6 when moved along the channel 12 will be raised about its hinge line 98 by the cover lifting plate 68 located on that side of the channel beyond which the cover projects as illustrated in FIG. 8. At the same time, the base of the carton will be held down on the conveyor 6 by the holddown members 60 and the inclined extensions and extremities 66 of the holddown members will aid in creasing the carton along the hinge lines 96 and 98 by which flange 94 and cover 86 are secured to the base 102 of the carton.

Figure 9:
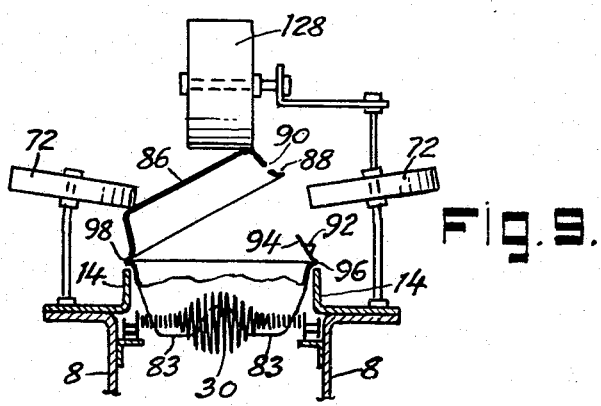
FIG. 9 is a sectional view taken on the line 9—9 of FIG. 1 with a carton of the type shown in FIG. 6 being closed.
Figure 10:
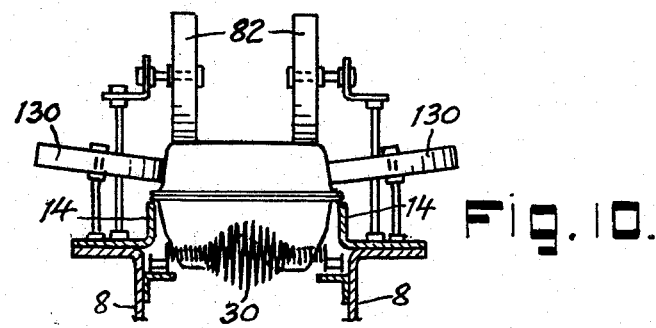
FIG. 10 is a sectional view taken on the line 10—10 of FIG. 1 showing the further closing of the carton of FIG. 6.

As the carton moves further along the channel 12 inwardly curved extensions 70 of the cover lifting plates 68 not only serve to move the cover 86 inward about its hinge line 98 but also serve to move the edge flange 94 at the opposite side of the base of the carton upward and inward about its hinge line 96 to positions as indicated in FIG. 9. Thereafter, the carton passes beyond the extremities 66 of the holddown members 60 and the cover 86 and edge flange 94 are brought into contact with the side rollers 72 and 74 and beneath an elevated initial cover pressing roller 128 as shown in FIG. 9. These rollers serve to press the edge flange 94 inward to a position inside the downwardly turned free edge 88 of the cover 86 whereupon the initial pressing roller 128 moves the cover down over edge flange 84 toward a position wherein the locking projections 92 may project outward through the openings 90 in the free edge 88 of the cover and as shown in FIG. 11. Continued movement of the closed carton past the lower central press roll 80 and final side rollers 130 and holddown rollers 82 to the position of FIG. 10 serves to perfect the closing, alignment, and registration of the cover and base and proper engagement of the locking projections 92 with the openings 90 so as to assure the interaction thereof to hold the cover in its closed position.

The operation of the carton closing equipment when closing the carton of FIG. 7 is essentially the same as that described above in connection with the carton of FIG. 6. Thus, the cover 100 is raised about its hinge line 104 by the lifting plate 68 as shown in FIG. 8 and the edge flange 116 with its locking tabs 114 and cover guiding tabs 122 is raised about its hinge line 120. The carton of FIG. 7 as supplied by the manufacturer has the locking tabs 114 projecting outward beyond the cover guiding tabs 122 as shown in FIG. 8. However, as the carton cover is moved downward by the initial cover pressing roller 128, the tapered edges 132 of corner pressing rollers 76 and 78 serve to assure the inward deflection of the cover guiding tabs 122 on the edge flange 116 and the outward deflection of the locking tabs 114 to receive the adjacent edge of the cover 100 therebetween. The final side rollers 130 operate to accurately establish the proper registration of the locking tabs 114 in the depressions 108 in the free edge 106 of the cover and positive engagement of the locking lugs 112 with the retaining lips 110 on the cover 100.

It will thus be apparent that the carton closing means provided render it possible to close substantially any and all types of egg cartons now on the market quickly and easily. The cartons may be made of any desired material since slippage of the carton on the carton supporting conveyor is positively prevented by the interengagement of the egg receiving cavities on the carton with the spaced and deformable cushioning elements on the conveyor.

Furthermore since the various elements of the carton closing means are symmetrically arranged at opposite sides and above the central channel through which the cartons are advanced by the conveyor, it is possible to properly close cartons having covers which are pivotally connected to the base of the carton along either or both edges of the base. Those cartons having a cover secured to one side only of the base can be fed into the equipment with either end foremost and the cover projecting either to the right or to the left as desired. Successive carons of different styles, types and differently positioned on the conveyor, can be fed one after another through the equipment without delay or the need for any change in the carton closing means. Nevertheless, it is generally desirable to mount each of the elements of the carton closing means on the frame of the equipment in such a way as to permit adjustment thereof to final or desired positions as required by any operator or as necessary after shipment and installation of the equipment in any location.

From the foregoing description, it will be apparent that the various elements of the equipment are capable of numerous changes and modifications in their form and arrangement in the combination. In view thereof, it should be understood that the particular embodiments of the invention shown in the drawings and described above are intended to be illustrative only and are not intended to limit the scope of the invention.

I claim:

1. In equipment for closing elongated egg cartons which have a base with longitudinally spaced downwardly projecting egg receiving cavities therein and a cover hingedly connected to at least one longitudinal edge of the base, said equipment embodying a carton supporting conveyor and means for closing the cover of a carton supported on the conveyor, the improvement comprising
   (a) elements on the conveyor engageable by the cartons to be closed, said elements
      (1) being spaced apart longitudinally of the conveyor and
      (2) shaped to enter the spaces between the egg receiving cavities in the base of a carton to be closed,
      (3) said elements being yieldable and deformable to enter differently shaped spaces between differently shaped egg receiving cavities in the base of different types of cartons.

2. Equipment as defined in claim 1 wherein said elements on the conveyor are coiled spring members.

3. Equipment as defined in claim 1 wherein said conveyor embodies
   (a) spaced longitudinally extending chains
   (b) transversely extending rods carried by said chains and
      (1) spaced apart longitudinally of the chain
   (c) coiled spring elements surrounding said rods and provided with
      (1) portions adjacent the ends of the rods which are of relatively small diameter and
      (2) a portion positioned adjacent the center of said rod which is of relatively large diameter and
      (3) deformable to enter the spaces between variously shaped egg receiving cavities projecting downwardly from the base of a carton supported on the conveyor.

4. Equipment as defined in claim 3 wherein said coiled spring elements are spaced apart longitudinally of the conveyor distances corresponding to the distances between the longitudinally spaced egg receiving cavities in the cartons to be closed.

5. Equipment as defined in claim 1 wherein the means for closing the cover embodies a plurality of cover engaging elements symmetrically arranged with respect to said conveyor and spaced apart above the central portion of this conveyor to permit cartons having cover portions hingedly secured to the base of the carton at either or both sides of the base to be closed by said cover engaging elements.

6. Equipment as defined in claim 5 wherein said elements include a plurality of rollers.

7. Equipment as defined in claim 1 wherein longitudinally extending lateral guides are located at opposite sides of said conveyor to define a channel along which cartons are movable by the conveyor, and said means for closing the cover embodies a plurality of elements symmetrically arranged adjacent to said channel and including longitudinally extending holddown members spaced vertically from and aligned with said guides to permit a cover for the carton to project outward from either or both sides of a carton beyond the lateral guides and beneath the holddown members.

8. Equipment as defined in claim 7 wherein said conveyor has means therein yieldably supporting a carton as it moves past said means for closing the cover of a carton.

9. Equipment as defined in claim 8 wherein upwardly and outwardly inclined cover lifting plates are positioned adjacent the outer sides of said lateral guides throughout at least part of the length of said holddown members.

10. Equipment as defined in claim 9 wherein cover closing elements in the form of rollers are positioned beyond the holddown members and engageable with a cover for the carton which has been raised by one of said cover lifting plates.

11. Equipment for closing any of a plurality of different types of elongated egg cartons having longitudinally spaced downwardly projecting egg receiving cavities and having the bases of the cartons provided with hinged cover members variously connected to the base of the carton at either or both sides of the base of the carton comprising a carton supporting conveyor and means for closing the cover members of the carton symmetrically arranged at opposite sides of said conveyor and including holddown members engageable with the cartons along the lines on which the cover members are hingedly connected to the base, cover lifting members located adjacent said holddown members and cooperating therewith to move the cover members upwardly and inwardly about said lines while the carton is held down on the conveyor by said holddown means, and rollers positioned to engage the cover members which have been moved upwardly and inwardly by said cover lifting means to move the cover members further about the hinge lines and into carton closing position.

References Cited

UNITED STATES PATENTS

| 2,842,920 | 7/1958 | Carkhuff et al. | 53—137 |
| 2,993,621 | 7/1961 | Mumma | 198—131 |
| 2,091,426 | 8/1937 | Benoit | 53—376 |
| 3,103,877 | 9/1963 | Manna | 198—131 |
| 2,877,610 | 3/1959 | Atkinson | 53—376 |

FOREIGN PATENTS 485,010   7/1952   Canada.

THERON E. CONDON, Primary Examiner

H. M. CULVER, Assistant Examiner

U.S. Cl. X.R.

198—131